United States Patent [19]

Clinton

[11] Patent Number: 4,751,371

[45] Date of Patent: Jun. 14, 1988

[54] TEMPERATURE CONTROLLER AND ALARM DEVICE FOR USE WITH A CARTRIDGE HEATER HAVING A HEATING ELEMENT AND THERMOCOUPLE

[76] Inventor: Henry Clinton, 10 Shore Rd., Clinton, Conn. 06413

[21] Appl. No.: 894

[22] Filed: Jan. 6, 1987

[51] Int. Cl.$^4$ .............................................. H05B 1/02
[52] U.S. Cl. ..................................... 219/506; 219/497; 219/508; 219/501; 361/47; 361/87
[58] Field of Search ............... 219/506, 490, 491, 494, 219/497, 499, 501, 504, 505, 507–509; 323/235, 236, 319; 361/78, 87, 44, 47; 307/38–41, 117, 252 UA

[56] References Cited

U.S. PATENT DOCUMENTS

| | | | |
|---|---|---|---|
| 3,946,200 | 3/1976 | Juodikis ................................. | 219/497 |
| 4,167,663 | 9/1979 | Granzow, Jr. et al. ............ | 219/497 |
| 4,511,790 | 4/1985 | Kozak .................................... | 219/497 |
| 4,554,439 | 11/1985 | Gross et al. .......................... | 219/497 |
| 4,639,611 | 1/1987 | Sticher ................................... | 219/497 |

*Primary Examiner*—M. H. Paschall

*Attorney, Agent, or Firm*—McCormick, Paulding & Huber

[57] ABSTRACT

A temperature controller and alarm device for use with a cartridge heater of the general type providing heat within a mold in a plastic injection molding apparatus includes an amplifier for sensing voltage signals developed by a thermocouple within the cartridge and which signal is representative of the temperature produced by the heater. The heater temperature is compared to a desired temperature and a signal proportional to the difference in temperature is coupled to a comparator which produces an output signal when the magnitude of a triangular signal exceeds the magnitude of the difference signal to cause the comparator to operate switches which connect and disconnect a DELTA configured three-phase voltage source to and from both sides of the heating element. Visual and audible alarms are provided to indicate the occurrence of a thermocouple open circuit fault condition, a heating element open circuit fault condition and a heating element short circuit fault condition. Another visual alarm is provided to indicate a fault condition associated with the switches.

16 Claims, 3 Drawing Sheets

TEMPERATURE CONTROLLER AND ALARM DEVICE FOR USE WITH A CARTRIDGE HEATER HAVING A HEATING ELEMENT AND THERMOCOUPLE

BACKGROUND OF THE INVENTION

The present invention relates generally to temperature controlling devices of the type used to regulate the temperature of a mold in plastic injection molding apparatus and deals more specifically with a temperature controller and alarm device particularly suited for use with a cartridge heater of the general type used in plastic injection molding apparatus.

It is well known that the temperature of a mold in a plastic injection molding apparatus must be maintained within a very narrow range, usually 1°-2° Fahrenheit, in order to produce a high quality plastic molded part that is durable and possesses the expected compressive and tensile strengths and other characteristics including visual appearance. In many cases, the mold is heated with a cartridge type heater that is inserted into a receptacle in the mold.

The cartridge heater typically is of the type manufactured by the TEMCO Electric Heater Corporation wherein the heater generally includes a resistive heating element and a thermocouple located within the cartridge housing. Electric power is applied to the heating element to cause it to produce heat proportional to the power applied. The thermocouple is utilized in the normal manner to permit the accurate measurement of a temperature produced by the heater. The amount of electric power supplied to the heater is proportional to the deviation in temperature from a desired temperature and is generally regulated by a closed loop temperature controller. The amount of time that electric power is supplied to the heater is accomplished using well known control techniques, such as, for example, phase angle firing of a triac or silicon controlled rectifier, or controlling the ON-OFF duty cycle of a periodically operated switch to select any desired average power.

Although temperature controllers currently used with plastic injection molding apparatus provide satisfactory regulation to maintain an acceptable temperature deviation from a desired temperature, all of the known controllers fail to address a number of practical problems.

One major drawback associated with known temperature controllers is that the molding process is permitted to continue when an alarm condition indicative of a trouble in the injection molding apparatus occurs. The continued operation often results in the destruction of the mold or molds affected by the trouble. The replacement cost of such a mold is very expensive, often ranging $30,000.00-$35,000.00.

Other problems may cause the production of large quantities of defective molded parts or may cause extensive damage to the temperature controller itself. In some instances, the molded plastic part appears visually to be acceptable; however, if the part is molded at a temperature other than the desired temperature the part may not possess the expected strength and may fail when used.

In addition, increased costs associated with lost production time as well as increased maintenance and repair to the molding apparatus are incurred as a result of the above-identified problems.

Many of the above-mentioned problems result from the various failure modes of a typical cartridge heater used with the plastic injection molding apparatus. For example, in one failure mode, the heating element may short circuit to the cartridge case or to the internal thermocouple associated with the cartridge heater. In another failure mode, the heater may fail to operate due to an open circuit condition caused by a physical break in the resistive element of the heater.

Yet another failure mode is associated with a high impedance or open circuit condition of the thermocouple. Conventionally, a very small current in the range of microamperes is made to flow in the thermocouple and the polarity of the voltage developed across the thermocouple is sensed such that an open circuit condition is indicated as a high temperature and causes the temperature controller to shut down. Since the current must be very small to minimize IR (voltage) drops in the leads connecting the thermocouple, present methods are often only useful in detecting impedances ranging generally from 10 megohms to an open circuit. Consequently, corroded or carbonized electrical connections to the thermocouple may go undetected resulting in inaccurate temperature measurements if the impedance of the thermocouple and its associated electrical circuit is less than the minimum detectable impedance and therefore, the plastic parts may be molded at a temperature other than the desired temperature resulting in the production of defective parts.

Still another problem associated with the failure mode of a heater is the way in which the power is supplied to the heater. Generally, facilities in which temperature controllers are used with plastic injection molding apparatus are serviced by a three-phase electrical power distribution system commonly known as a DELTA configured power system. In such a DELTA configured system, each phase of the three voltage phases is developed across any two of the three conductors forming the DELTA power system. In some instances, a neutral or ground potential conductor is present with the three conductors forming the DELTA power system. The neutral conductor usually carries only unbalanced currents resulting from an electric load, such as, for example, a lighting circuit powered from a WYE configured power system. As is well known, the current carrying capacity of a neutral conductor such as present in a WYE power system is generally much less than the current carrying capacity of any of the conductors comprising the DELTA power system. Additionally, in some facilities serviced by a DELTA power system, the neutral conductor is not present. Consequently, the preferred connection of a heater is line-to-line rather than line-to-neutral to avoid heavy currents in the neutral line.

One problem associated with a heater connected from line-to-line rather than line-to-neutral is that an AC potential is present from each of the line conductors to an electrically grounded neutral. Accordingly, components comprising the heater are also at a high potential with respect to a neutral and additionally, with respect to an electrically grounded frame of the injection molding press, mold and the heater case.

To applicant's knowledge, temperature controllers currently in use connect and disconnect only one voltage line of the two voltage lines across which the heater is connected to remove power from the heater. A major problem occurs, however, when a short circuit develops between the heating element and the heater case. In this failure mode, current flows through the heating element from both voltage lines into the point at which the short circuit has occurred. The additional current flowing through the heating element causes the heater temperature to increase beyond its temperature set point until the temperture controller attempts to remove power to the heater by disconnecting one line from the heater. However, current continues to flow from the other of the voltage lines through the heating element and into the short circuit point. The heater temperature continues to increase due to the current flowing through the heating element to the short circuit point until such time as the controller itself is damaged or the current rises above the rated value of a fuse in series with the voltage line supplyrng current to the heater or until the heating element itself open circuits between the input and the short circuit point.

A number of currently available controllers detect some of the above mentioned fault conditions, such as, for example, an open circuit condition of the thermocouple or a short circuit condition of the heating element. However, these controllers are generally unsatisfactory, do not address all the problems identified above, do not provide adequate alarms, and most importantly do not immediately remove power from the heater.

Often, the only output alarm signal indicating that a fault condition has been detected is in the form of an illuminated panel lamp. A panel lamp warning is generally ineffective since a number of different temperature controllers may be used in any one process, and the illumination of a single panel lamp may go unnoticed or ignored by a busy machine operator. As a result, a fault condition that may drastically affect the quality of a molded part and/or the molding apparatus itself is allowed to persist and worsen.

It is an object of the present invention therefore to provide a temperature controller and alarm device for use with a plastic injection molding apparatus that overcomes the above-described problems.

It is another object of the present invention to provide a temperature controller and alarm device that automatically shuts down operation of a heater when a trouble condition associated with the heating element and thermocouple of the associated cartridge heater is detected.

It is a further object of the present invention to provide a temperature controller for connecting and disconnecting power from both sides of a heating element in a cartridge heater used with a plastic injection molding apparatus.

It is yet a further object of the present invention to detect open circuit and short circuit fault conditions associated with the heating element in a cartridge heater.

It is a yet further object of the present invention to detect and provide an alarm to indicate a high impedance or open circuit fault condition with a thermocouple associated with the heater.

It is a still further object of the present invention to provide a temperature controller having an alarm device that automatically regulates the temperature of a heater to within a small deviation range of a desired temperature.

Additional objects, features and advantages of the present invention will be readily apparent from the following description and drawings forming a part thereof.

SUMMARY OF THE INVENTION

In accordance with the present invention, the temperature controller and alarm device for use with a cartridge heater of the general type providing heat within a mold in a plastic injection molding apparatus wherein the heater includes a heating element and a thermocouple within the cartridge is presented. The thermocouple produces a voltage signal directly proportional to the temperature generated by the heater and sensed by the thermocouple. A first amplifier is coupled to the thermocouple and amplifies signals produced by the thermocouple. The output of the first amplifier is fed to a comparator that compares this voltage signal to a voltage signal representative of a desired temperature to be produced by the heater. The output of the first comparator produces a signal proportional to the difference between the sensed temperature and the desired temperature. The output of the first comparator is coupled to a second comparator which has one input connected to a waveform generator which produces a triangular waveform signal repetative at a predetermined frequency. An output voltage signal is present at the output of the second comparator when the magnitude of the triangular wave exceeds the magnitude of the output signal from the first comparator. The output of the second comparator is coupled to solid state switches, each of which connects one side of a DELTA configured three-phase voltage source to the appropriate side of the heating element. The switches are operated to couple power to the heating element each time there is an output voltage signal present at the output of the second comparator. Accordngly, both sides of the heating element are alternately connected and disconnected from the voltage source to regulate the temperature produced by the heating element.

The invention further resides in an oscillator circuit arranged with the thermocouple as an element in its oscillation feedback path so that the oscillator stops oscillating when the impedance of the thermocouple exceeds a predetermined value. An alarm circuit responsive to the absence of the oscillatory signal drives a visual indicating device and is coupled to an alarm responsive circuit which has an output coupled to the input of the second comparator to prevent the second comparator from producing an output signal to activate the switches.

The invention further resides in a second alarm circuit for sensing the current flowing to both inputs of the heating element and which produces an output signal when the currents are not equal indicating that a short circuit condition exists between the heating element and the cartridge. The presence of a short circuit fault condition causes a second alarm signal to be generated which in turn operates a second visual indicating device and also activates the alarm responsive circuit to prevent the connection of power to the heating element.

The invention further resides in the detection of an open circuit condition associated with the heating element wherein a third alarm signal is produced to activate the second visual indicating device.

The invention further resides in the activation of an audible alarm in the presence of a first, second and third alarm srgnal.

The invention still further resides in a third comparator coupled across the first comparator to limit the output voltage signal of the first comparator to a magnitude equal to a predetermined warm-up temperature until the heater produces that temperature at which time the normal operation of the controller is resumed.

DETAILED DESCRIPTION OF THE PREFERRED EMBODIMENTS

Figure 1:
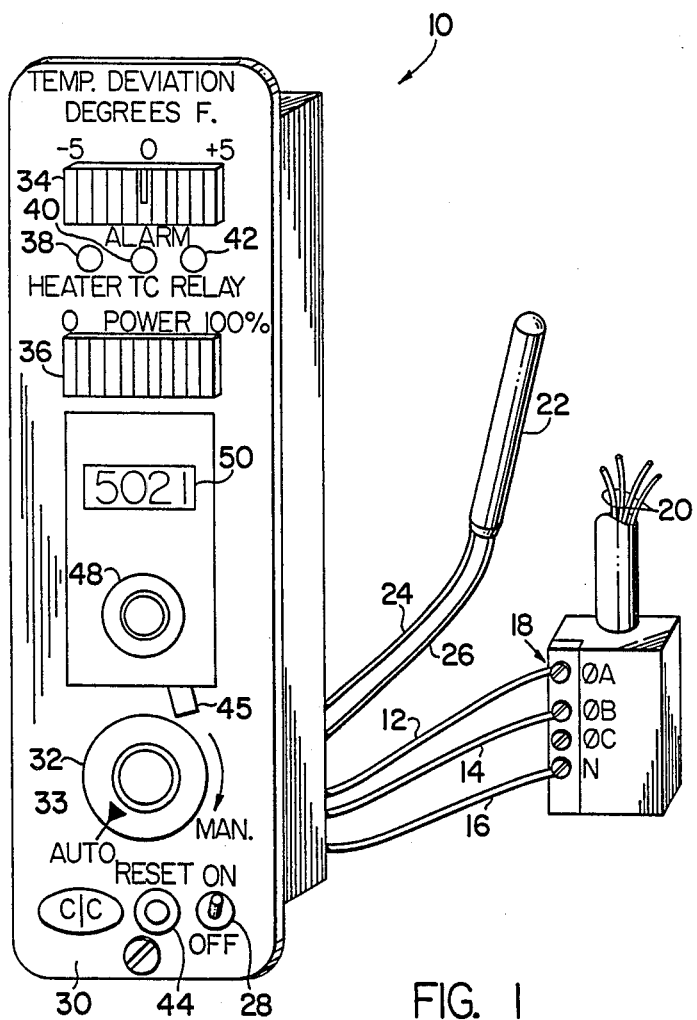
FIG. 1 is a somewhat perspective view of the front panel and enclosure module containing the components comprising the temperature controller and alarm device embodying the present invention wherein the device is shown connected to a cartridge heater.

Turning now to the drawings and considering FIG. 1 specifically, a front panel and enclosure module containing the electronic components comprising the temperature controller and alarm device of the present invention is shown in perspective view and designated 10. The enclosure module in the illustrated embodiment is arranged for flush mounting on a control panel of a plastic injection molding apparatus with which the controller 10 is used. The controller 10 is electrically coupled via conductors 12 and 14 to one phase of a three-phase voltage source, which source is commonly referred to as a "DELTA" configured three-phase voltage source. The controller 10 is also connected via conductor 16 to the neutral conductor in an electric power distribution system supplying power to a facility wherein the molding apparatus is located. As illustrated in FIG. 1, the conductors 12, 14 and 16 are connected to a terminal strip 18 and to a three-phase voltage power source via a four conductor cable designated 20. A cartridge heater 22 of the type with which the temperature controller and alarm device of the present invention is used is coupled to the controller 10 via conductors 24 and 26.

Electrical power is connected and disconnected to and from the controller 10 by an ON-OFF switch 28 mounted on the front panel 30 of the controller. As explained in further detail below, the controller 10 operates in an automatic mode or a manual mode and is selectable by operating a selection knob 32. The knob 32 includes a tab 33 which contacts a lever 45 of a transfer switch (shown in FIG. 2 and designated 46) as the knob is rotated to select either manual or automatic operation.

A center zero position meter 34 is also mounted on the front panel 30 and is used to indicate the temperature deviation from a preselected, desired temperature. In the preferred embodiment, the deviation range is +/− five degrees (5° F.) from the preselected temperature. A second meter 36 is also mounted on the front panel 30 is used to indicate the percentage of full power applied to the heater 22. The meters 34 and 36 are preferably solid state LED (light emitting diode) bar meters of the type generally well known and understood by those skilled in the art.

A number of visual indicators each of which is associated with an alarm condition related to the cartridge heater, thermocouple or relays used to connect and disconnect power to and from the heating element of the cartridge heater 22 are mounted on the front panel 30. The indicator associated with a heater alarm is designated 38; the indicator associated with a thermocouple alarm is designated 40 and the indicator associated with a relay alarm is designated 42. In the preferred embodiment, the indicators 38, 40 and 42 are LED's.

Also included on the front panel 30 is a momentarily operated reset button 44 which is used to reset the control circuitry and retire an associated alarm after a corresponding trouble condition is repaired, the operation of which is explained in further detail below.

A temperature that is desired to be produced by the cartridge heater 22 is selectable by the operation of a multiturn potentiometer connected to a knob 48 located on the front panel 30. A desired temperature is selectable by turning the knob 48 until the desired temperature is displayed on a digital display device 50. In the preferred embodiment, the desired temperature may be set within the range of 0° to 1,000° F.

Figure 2A:
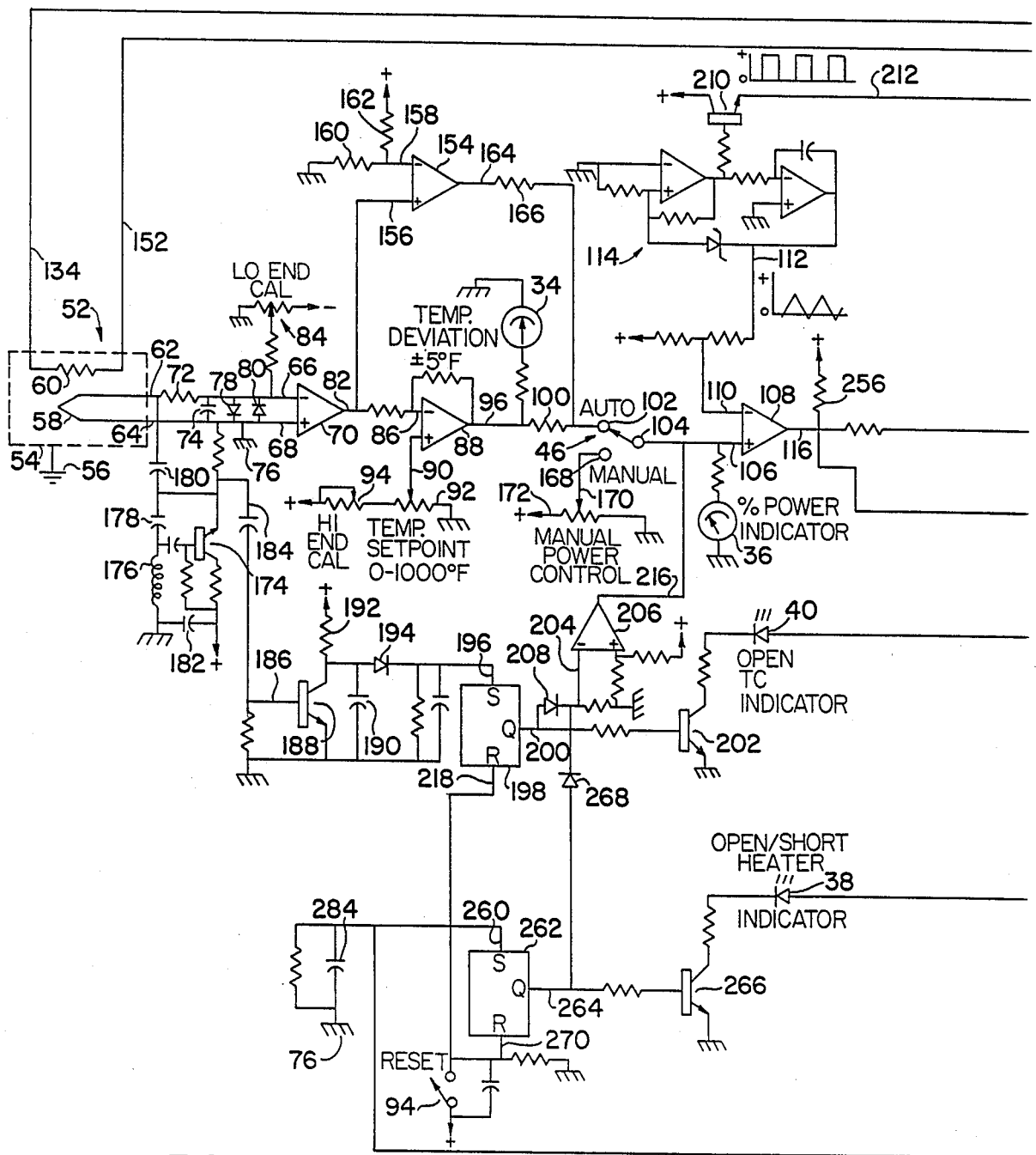
FIG. 2 is collectively formed by FIGS. 2A and 2B each of which is part of an electrical circuit schematic comprising the temperature controller and alarm device of the present invention.
Figure 2B:
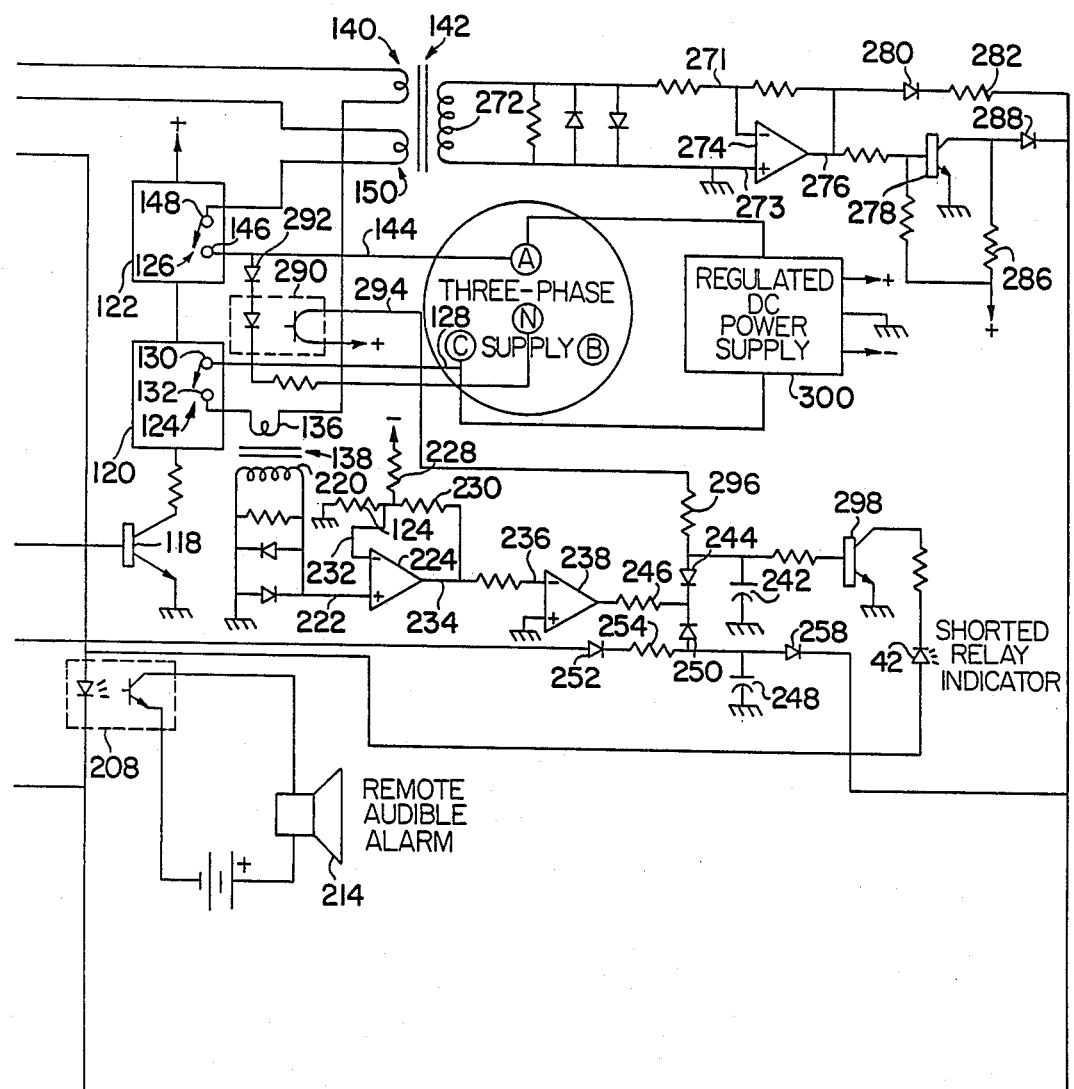

Turning now to FIG. 2, the temperature controller and alarm device of the present invention is implemented in a preferred embodiment by the electrical circuit schematic shown therein. A cartridge heater generally designated 52 includes a case 54 connected to a ground electrical reference potential 56 and which case encloses a thermocouple 58 and a resistive heating element 60. A voltage developed by the thermocouple 58 corresponds to the temperature sensed at the thermocouple and appears across output leads 62 and 64 connected to the thermocouple and which voltage is coupled to the inputs 66, 68 of an amplifier 70. A resistor 72 is connected in series with lead 62 of the thermocouple 58 and the inverting input 66 of the amplifier 70 to limit the magnitude of the current supplied to the inverting input of the amplifier 70. A capacitor 74 is coupled across the inputs 66 and 68 to bypass AC signals which may be present in the voltage developed by the thermocouple 58. The noninverting input 68 of the amplifier 70 and the lead 64 of the thermocouple 58 are returned to a ground reference potential 76. Diodes 78 and 80 are connected across the inputs 66 and 68 of the amplifier 70 and are arranged so that the anode of diode 70 and the cathode of diode 80 are connected to input 66 and the cathode of diode 78 and the anode of diode 80 are connected to the input 68. The diodes 78 and 80 protect the amplifier 70 from damage which may be caused if a high voltage is accidentally applied across the thermocouple leads 62 and 64.

The amplifer 70 is a special purpose amplifier particularly suited for operation with a thermocouple and which provides an output voltage signal proportional to the temperature. The amplifier 70 may be implemented with a commercially available device manufactured and sold by Analog Devices Inc. of Norwood, Mass. and is identified by component number AD596/AD597. The AD596 is typically used with a type J thermocouple while the AD597 is typically used with a type K thermocouple each of the thermocouple types operating over a different temperature range.

The temperature proportional output voltage signal produced by amplifier 70 at its output 82 is calibrated at the lower temperature in the range by adjusting the biasing voltage developed by the resistive voltage divider combination generally designated 84 so that the magnitude of the output voltage signal corresponds to the temperature sensed by the thermocouple 58. The output 82 of amplifier 70 is coupled to the inverting input 86 of a comparator amplifier 88. The noninverting input 90 of amplifier 88 is connected to a multiple-turn potentiometer 92 which has one end connected to a ground potential 76 and its other end connected to one end of a variable resistance 94. The opposite end of the resistance 94 is connected to a d.c. voltage potential. The input 90 is connected to a slideable tap on the resistor 92 and which tap is moved by rotation of the knob 48 to provide a DC reference voltage potential at the input 90 corresponding to the desired temperature to be controlled. The temperature reading is indicated by the digital display 50 and is calibrated to correspond to the temperature at the thermocouple 58 when the inputs 86 and 90 of amplifier 88 are at the same voltage potential. Calibration at the higher temperature in the range is achieved by adjusting the variable resistance 94 to provide voltage at the input 90 of amplifier 88 so that both the temperature displayed by the digital display 50 and the temperature set point as selected by turning the knob 48 connected to the variable resistance 92 correspond to the temperature at the thermocouple 58 as represented by the voltage signal at the input 86 to the amplifier 88.

The amplifier 88 amplifies the difference, if a difference is present, between the voltage potentials appearing at the inputs 86 and 90 to produce an output voltage signal proportional to and representative of the temperature deviation from a desired preset temperature. A zero temperature deviation corresponds to the output voltage signal appearing at the output 96 of the amplifier 88 being equal to half the positive d.c. voltage potential. A rise in temperature above the preset temperature reduces the magnitude of the output voltage signal of the amplifier 88 while a drop below the preset temperature increases the magnitude in the output voltage signal. The magnitude of the voltage signal at the output 96 of the amplifier 88 is visually indicated by the LED bar meter 34.

The output 96 of the amplifier 88 is also connected to an auto/manual switch 46 which when set in the auto position couples the output 96 through a resistor 100 to a contact 102 of the switch 46. In the auto position, the switch 46 connects the transfer contact 104 to the contact 102 to couple the output 96 of the amplifier 88 to the noninverting input 106 of a comparator 108. The inverting input 110 of the comparator 108 is coupled to a waveform generating circuit generally designated 114 which produces a linear triangular waveform on the lead 112 coupled to the output of the triangular waveform generator portion of the generating circuit. The voltage potential at the output 116 of the comparator 108 switches between the magnitude of the positive d.c. supply voltage potential and zero at a four hertz rate. If the temperature deviation is zero, the output 116 of the comparator 108 is positive one half the time and zero the other half.

The amplitude of the triangular waveform is selected so that as the voltage at the output 96 of the amplifier 88 travels from zero to the value of the positive d.c. voltage supply potential, the percentage of the time that the output 116 of the comparator 108 stays at the positive d.c. voltage supply potential varies directly with the voltage magnitude at the output 96 and ranges from zero to one hundred percent of the time.

The output 116 of the comparator 108 is connected to an NPN transistor 118 having an emitter terminal connected to the ground reference potential and a collector terminal connected in series with solid state switches 120 and 122 and the positive d.c. voltage supply potential. The solid state switch 120 includes a normally open contact 124 and the switch 122 includes a normally open contact 126. When the transistor 118 becomes conductive, the switches 120 and 122 are energized and cause their respective contacts 124 and 126 to close providing an electrical path through the switch. As can be seen, the switches open and close at a four hertz rate and remain closed as long as the output 116 is positive.

In the illustrated embodiment, one line of the DELTA three-phase power supply is connected via lead 128 to terminal 130 of the normally open contact 124. The other terminal 132 of the contact 124 is coupled to one side 134 of the heating element 60 through a primary winding 136 of a current transformer 138 whose function is explained below. The primary winding 136 of the current transformer 138 is connected in series with the primary winding 140 of another current transformer 142 to complete one leg of the circuit supplying power to the terminal 134 of the heating element 60. A second line of the DELTA three-phase power supply is connected via conductor 144 to a terminal 146 of the normally open contact 126. The terminal 148 of the contact 126 is connected to one side of a second primary winding 150 of the current transformer 142. The opposite side of the primary winding 150 is connected to the other terminal 152 of the heating element 60. Consequently, power is supplied to both sides of the heating element 60 through the solid state switches 120 and 122. The temperature produced by the cartridge heater 52 is stabilized at the desired temperature by sequentially connecting and disconnecting the power to and from the heating element 60. The time that the electronic switches 120 and 122 are operated equal proportional to the time that the output 116 of the comparator 108 stays at the positive d.c. voltage supply potential.

In order to extend the useful life of the heating element 60, it is desirable to not apply full power to the heating element when the equipment is initially activated. Consequently, a soft start interval is provided which gradually increases the temperature of the heating element to about 250° F. after which time full power may be supplied without imposing a detrimental effect on the heating element. The soft start is accomplished as follows. A comparator 154 has its noninverting input 156 coupled to the output 82 of the amplifier 70. The inverting input 158 of the comparator 154 is coupled to a DC bias voltage potential which is set by the voltage divider action of the resistors 160 and 162 and which bias voltage potential corresponds to a 250° F. temperature output voltage signal at the output 82 of amplifier 70. At temperatures below 250° F., the output 164 of the comparator 154 is at a low voltage potential and is coupled through a resistor 166 to a contact 102 corresponding to the auto position of the switch 46. The value of resistor 166 is equal to the value of resistor 100 so that the magnitude of the voltage signal at the input 106 of the comparator 108 is limited to one half its maximum value for temperatures at or below 250° F. When the temperature rises above 250° F., the output 164 of the comparator 154 switches to a high voltage potential allowing the voltage signal at the output 96 to rise to its maximum value corresponding to the desired preset temperature.

In some instances it is desirable to manually control the power supplied to the heating element 60 and consequently, the temperature developed by the cartridge heater 52. Manual control is generally desirable, for example, during set up periods or during the initial production of molds to determine the optimum molding temperature. The switch 46 is operated to its manual position by rotating the knob 32 to connect contact 104 to the contact 168. The contact 168 is connected to a movable tap 170 of a potentiometer 172 having its ends connected between the d.c. supply voltage potential and the ground reference potential. A control voltage signal proportional to the position of the tap 170 between the ends of the potentiometer 172 is coupled to the noninverting input 106 of the comparator 108 to control the proportional ON-OFF times of the solid state switches 120 and 122 and accordingly, the power applied to the heating element 60.

Turning now to the alarms and fault condition detectors of the present invention and first considering a circuit fault condition associated with the thermocouple 58 wherein the thermocouple exceeds a predetermined resistance or becomes open circuited. In the preferred embodiment, a Colpitts oscillator circuit comprising a transistor 174, an inductor 176 and capacitors 178 and 180 is connected in parallel with the thermocouple 58. The oscillation feedback path is through the series combination comprising the thermocouple 58, transistor 174 and a bypass capacitor 182. The output 184 of the oscillator is coupled to the base 186 of a transistor 188 and when the oscillator operates causes the transistor 188 to become conductive which provides a discharge path for a capacitor 190 connected across the emitter and collector terminals of the transistor 188. The collector of transistor 188 is maintained at a low voltage potential through the discharged capacitor 190 coupled to the ground reference potential. If the thermocouple resistance exceeds a predetermined value, generally a few hundred ohms or becomes open-circuited, the oscillator stops oscillating which causes the transistor 188 to turn-off or become non-conductive. The capacitor 190 now charges to the d.c. positive voltage supply potential through a resistor 192 coupled to it and the collector of the transistor 188 and to the anode of a diode 194. The cathode of the diode 194 is coupled to the set input 196 of a flip-flop 198. When the capacitor 190 charges to the d.c. positive voltage supply potential, the diode 194 becomes forward biased setting the flip-flop 198 which causes its output 200 to become a positive voltage signal. The output 200 of the flip-flop 198 is coupled to the base of a transistor 202 and the inverting input 204 of a comparator 206 through a diode 208 arranged with its anode connected to the flip-flop output 200. The collector of the transistor 202 is connected to the cathode of a LED 40. The anode of the LED 40 is coupled to the cathode of a diode in an optical coupler 208. The anode of the diode in the optical coupler is connected via lead 212 to the emitter of a transistor 210 operating as an emitter follower in the waveform generator 114 which provides a four hertz square wave on the lead 212. Since the LED 40 becomes forward biased by the voltage potential of the square wave appearing on the lead 212, the LED flashes to indicate an open circuit condition associated with the thermocouple 58. The output of the optical coupler 208 is connected to a remote audible alarm 214 which alarm turns on and off at a four hertz rate.

Additionally, during the time of a thermocouple open circuit fault condition, the output 216 of the comparator 206 changes to a low voltage potential which clamps the noninverting input 106 of the comparator 108 to a low voltage potential. The presence of the low voltage causes the output 116 of the comparator 108 to also change to a low voltage potential to turn off the transistor 118 and accordingly, remove operating power from the solid state switches 120 and 122. Consequently, power is also removed from the heating element 60 when the normally open contacts 124 and 126 associated with the electronic switches 120 and 122 respectively, return to their normally open condition.

When the thermocouple open circuit condition is repaired, the flip-flop 198 is reset by operating a reset switch 94 coupled to the reset input 218 of the flip-flop 198. Upon resetting the flip-flop 198, the signal at the output 200 is returned to a low voltage potential which causes transistor 202 to be turned off and consequently, extinguishes the LED 40 and retires the audible alarm 214. The output 216 of comparator 206 also changes to a positive voltage potential so that the normal temperature control loop operation is restored.

Turning now to the detection and alarm associated with a heater open circuit fault condition, and recalling that the current transformer 138 has its primary winding 136 effectively connected in series with the heating circuit, a voltage potential is developed across the secondary winding 220 of the transformer 138 when current is supplied to the heating element 60. The secondary winding 220 is connected to the noninverting input 222 of an amplifier 224. The amplifier 224 is biased by the resistor voltage divider combination 226 and 228, the tie-point of which is connected to the inverting terminal 232 of the amplifier 224 to keep the amplifier output 234 at a slight positive voltage potential. The output 234 of amplifier 224 is fed back to the inverting input 232 through feedback resistor 230 and is coupled to the inverting input 236 of a comparator 238. The output 240 of the comparator 238 is a non-conducting transistor collector output in the absence of a current signal from the current transformer 138.

When current flows in the primary winding 136 of the current transformer 138, the output transistor in the comparator 238 becomes conductive and discharges a capacitor 242 through a diode 244 having its anode connected to the capacitor and through a resistor 246 connected to the cathode of the diode 244 and the output 240 of the comparator 238. Also at this time, a capacitor 248 is discharged through a diode 250 having its anode connected to the capacitor. The diode 250 has its cathode connected to one end of the resistor 246 allowing the capacitor 248 to discharge through the diode 250 and the resistor 246 into the collector output 240 of the comparator 238. During normal operation, positive voltage pulses at a four hertz rate are coupled from the output 116 of the comparator 108 through a diode 252 having its anode connected to the output 116 of the comparator 108, through a resistor 254 connected between the cathode of the diode 252 and the junction of the capacitor 248 and the diode 250. The time constant of the resistor 254 and capacitor 248 combination is approximately one second; however, the capacitor 248 is not able to charge appreciably since as explained above, the capacitor 248 is discharged through the diode 250, resistor 254 into the output of the comparator 238 under normal operating conditions.

If the heater element 60 becomes open circuited, current no longer flows through the primary winding 136 of the current transformer 138 and consequently, no voltage signal is developed across the secondary winding 220. Since the capacitor 248 cannot discharge through the diode 250 and the resistor 246 into the output of the comparator 238, it charges to the d.c. positive supply voltage potential through the resistor 254, diode 252 and resistor 256. The positive voltage potential now on the capacitor 248 forward biases a diode 258 which has its anode connected to the junction of the capacitor 248, resistor 254 and anode of diode 250. The cathode of the diode 258 is connected to the set input 260 of a flip-flop 262. The flip-flop 262, in the preferred embodiment is designed to switch when the input voltage signal equals one half the d.c. positive supply voltage potential. The flip-flop 262 is set at this time which causes the output 264 of the flip-flop 262 to change to a positive voltage potential. The output 264 is coupled to the base of a transistor 266 which causes the transistor to become conductive when the output of the flip-flop 262 is a positive potential. An LED 38 has its cathode connected to the collector of transistor 266 and its anode connected to the cathode of the diode in the optical coupler 208 which, as explained above receives square wave pulses from the waveform generator 114 on lead 212. The LED 38 operates in a similar manner as the LED 40 and flashes at a four hertz rate in the presence of a heater open circuit condition. The audible alarm 215 also operates at a four hertz rate as explained above in conjunction with the operation of the optical coupler 208.

The output 264 of the flip-flop 262 is also connected to the anode of a diode 268 which diode has its cathode connected to the inverting input 204 of the comparator 206 so that a positive voltage potential at the output 264 of the flip-flop 262 causes the output 216 of the comparator 206 to change to a low voltage potential, and as explained above, causes power to be removed from the heating element input terminals 134 and 152. It is readily apparent to those skilled in the art that diodes 208 and 268 and comparator 206 are configured as a logical OR element wherein the anode of diode 208 is one input and the anode of diode 268 is another input, the output of the OR element being the output 216 of the comparator 206.

The visual and audible alarms associated with the heater open circuit fault condition will continue until the fault is corrected and the circuit is restored to a normal operating condition by the operation of a reset switch 94 connected to the reset input 270 of the flip-flop 262. When the reset switch 94 is operated, the output 264 of the flip-flop 262 returns to a low voltage potential. The diode 268 becomes reverse biased and the transistor 266 becomes non-conductive.

Considering now the detection and alarm associated with a short circuit fault condition that occurs when the heating element 60 comes in contact with the grounded case 54 of the heater cartridge 52. As explained above, the heating element 60 is effectively connected line-to-line across a three-phase DELTA configured voltage source. Also recalling that each of the primary windings 140 and 150 of the current transformer 142 is respectively connected in series with each input terminal 134, 152 of the heating element 60, current flows through the primary windings when power is supplied to the heating element. The windings 140 and 150 are arranged in phase opposition so that currents flowing through the windings during normal circuit operation do not induce a voltage across the secondary winding 272 of the transformer 142. If a short circuit occurs between the heating element 60 and the grounded case 54, the currents flowing into the heating element 60 from both lines of the three-phase voltage source will not be the same. The difference in currents causes a voltage to be induced across the secondary winding 272 of the transformer 142.

The secondary winding 272 is coupled across the inputs 271 and 273 of an amplifier 274. The amplifier 274 has an output 276 coupled to the base of a transistor 278. The output 276 of the amplifier 274 is also connected to the anode of a diode 280. The cathode of the diode 280 is connected to one side of a resistor 282 and the other side of the resistor 282 is connected to one end of a capacitor 284 coupled from the set input 260 of the flip-flop 262 to a ground reference potential 76. The positive half cycles of the voltage induced in the secondary winding 272 are amplified by the amplifier 274 which in turn charges capacitor 284 through the diode 280 and resistor 282. The negative half cycles of the voltage induced in the secondary winding 272 are also amplified by the amplifier 274 and the output 276 causes the transistor 278 to become non-conductive during which time the capacitor 284 charges through a resistor 286 coupled between the d.c. positive voltage supply potential and the collector of transistor 278 and the anode of a diode 288. The cathode of the diode 288 is also connected to the junction of the capacitor 284 and the set input 260 of the flip-flop 262 so that during the negative half cycles when the transistor 278 is non-conductive, current flows through the resistor 286 and the diode 288 to charge the capacitor. Once the capacitor 284 charges to at least one half the d.c. positive voltage supply potential, the flip-flop 262 is set and the LED 38 and audible alarm 214 operate as explained above to indicate a heater short circuit fault condition. Also as explained above, the visual and audible alarms continue until the fault condition is corrected and the circuit is reset to its normal operating condition by the operatron of the reset switch 94.

Considering now the detection and alarm associated with a fault condition in the solid state switches 120 and 122, respectively. The switches 120 and 122 will normally fail in a short circuit condition, that is, the normally open contact will close and provide a continuous conduction path through the switch. Should one of the switches fail in this mode, the controller 10 will continue to function normally, however, it is desirable to indicate the detection of such a failure so that the defective relay may be replaced at an appropriate time.

The detection of a relay short circuit fault condition is accomplished as follows. An optical coupler 290 is used to detect the presence of voltage on one input terminal to the heating element 60. In the illustrated embodiment, the optical coupler 290 is shown coupled between a protective diode 292 connected to the contact 146 of the solid state switch 122 and the neutral conductor associated with the three-phase power distribution system in the facility. If the relay 122 fails in the short circuited condition, a positive voltage will be present at the input to the optical coupler 290 even when the heater 52 is switched to the OFF condition. Consequently, during the OFF interval, the output 294 of the optical coupler 290 is at a positive voltage potential and charges capacitor 242 through a resistor 296 connected between the output 294 of the optical coupler and the capacitor. Since the controller is not calling for heater current to flow during the OFF time, capacitor 242 does not discharge through the diode 244 and resistor 246 into the output 240 of the comparator 238, but instead causes a transistor 298 which has its base coupled to the capacitor 242 to conduct. The collector of the transistor 298 is connected to the cathode of the LED 42 and the annode of the LED is connected to the output lead 212 from the waveform generator 114. The square wave pulses present on the lead 212 causes the LED 42 to flash at a four hertz rate until such time as the fault condition is corrected.

The d.c. supply voltage potentials required to operate the various components comprising the temperature controller and alarm device of the present invention are generated using power supply circuits generally well known to those skilled in the art and indicated functionally by the function block 300.

A temperature controller and alarm device particularly suited for use with a cartridge heater of the type used in plastic injection molding apparatus has been described above in a preferred embodiment. It will be understood that numerous changes to the circuit embodying the invention may be made by those skilled in the art and therefore, the invention has been described by way of illustration rather than limitation.

I claim:

1. A temperature controller and alarm devices for regulating the heat produced by a cartridge heater having an internally encased resistive heating element and a thermocouple, said heating element having two inputs for connection to two respective voltage lines of a DELTA configured, three-phase voltage source and said thermocouple having connecting means and producing a voltage signal having a magnitude proportional to the temperature in the vicinity of the thermocouple, said device comprising:

first switching means coupled between one of said two inputs of the heating element and one voltage line of the three-phase voltage source for connecting and disconnecting said one input to and from the voltage source;

second switching means coupled between another of said two inputs of the heating element and a second voltage line of the three-phase voltage source for connecting and disconnecting said another input to and from the voltage source;

means coupled to the thermocouple contained within said cartridge heater for sensing the magnitude of a voltage produced by the thermocouple, said thermocouple voltage being related to and representative of the temperature in the vicinity of the thermocouple, said thermocouple sensing means producing a voltage signal having a magnitude representative of and proportional to the temperature in the vicinity of the thermocouple;

first comparator means having one input coupled to said thermocouple sensing means and a second input coupled to a reference temperature voltage means, said reference temperature voltage being adjustable and representative of a desired temperature to be produced by the heater, said first comparator having an output and generating a voltage signal representative of the deviation of the temperature produced by the heater and the desired temperature, and means responsive to said first comparator and coupled between said first comparator output and said first and second switching means for operating said first and second switching means when an output voltage signal is present at said first comparator output so that both inputs of the heating element are alternately connected and disconnected from the three-phase voltage source when the temperature produced by the heater is less than the desired temperature.

2. A temperature controller and alarm device as defined in claim 1 further comprising:
means for detecting the presence of a short circuit fault condition between said heating element and the cartridge, and
means coupled to said heating element short circuit fault detecting means for producing an output voltage signal representative of said short circuit fault detection.

3. A temperature controller and alarm device as defined in claim 2 further comprising:
means for detecting the presence of an open circuit fault condition in said heating element, and
means coupled to said heating element open circuit fault detecting means for producing a voltage signal representative of the detection of said open circuit fault condition.

4. A temperature controller and alarm device as defined in claim 3 further comprising:
means responsive to said heating element open circuit and short circuit fault conditions for producing an alarm signal to indicate the detection of a fault condition associated with the heating element.

5. A temperature controller and alarm device as defined in claim 1 further comprising:
means for detecting the presence of a high impedance circuit fault condition associated with said thermocouple, and
means coupled to said thermocouple high impedance detecting means for producing a voltage signal representative of the detection of said high impedance fault condition.

6. A temperature controller and alarm device as defined in claim 5 wherein said high impedance circuit fault condition is an open circuit.

7. A temperature controller and alarm device as defined in claim 5 further comprising:
means responsive to the detection of said thermocouple high impedance circuit fault condition for producing an alarm signal to indicate the detection of a fault condition associated with the thermocouple.

8. A temperature controller and alarm device as defined in claim 7 wherein said thermocouple high impedance detection means is coupled to one input of a first OR logic circuit element, said first OR logic circuit element having an output coupled to said means responsive to said first comparator responsive means to prevent said switching means from being energized so that said first and second lines of said voltage source are disconnected from said heating element whereby said heating element is prevented from generating heat.

9. A temperature controller and alarm device as defined in claim 7 wherein said thermocouple high impedance detection means comprises an oscillator wherein said thermocouple is an element comprising the feedback path of said oscillator, said oscillator generating an oscillatory signal when the impedance of said thermocouple is less than a predetermined impedance, said predetermined impedance being less than the maximum possible impedance allowable in said feedback path to sustain oscillation and said oscillator being arranged not to generate an oscillatory signal when the impedance of said thermocouple exceeds said predetermined impedance.

10. A temperature controller and alarm device as defined in claim 4 wherein said means responsive to said heating element open and short circuit fault conditions includes an output coupled to an input of a first OR logic circuit element, said first OR logic circuit element having an output coupled to said means responsive to said first comparator and producing a voltage signal at its output to disable said first comparator responsive means to prevent said switching means from being energized so that said first and second lines of said voltage source are disconnected from said heating element whereby said heating element is prevented from generating heat.

11. A temperature controller and alarm device for use with a cartridge heater of the general type providing heat within a mold in a plastic injection molding apparatus wherein the cartridge heater includes within the cartridge a heating element and a thermocouple, said thermocouple producing a voltage signal directly related to the temperature generated by the heater, said device comprising:

first amplifier means having an input coupled to the thermocouple contained within the cartridge heater for sensing and amplifying voltage signals produced by the thermocouple, said first amplifier having an output and producing a voltage signal having a magnitude directly related to the temperature of the heater;

a first comparator means having one input coupled to said output of said first amplifier and a second input coupled to a reference voltage source, said reference voltage being adjustable and representative of a desired temperature to be produced by the heater, said first comparator having an output and generating a voltage signal representative of the deviation of the temperature produced by the heater and the desired temperature;

second comparator means having one input coupled to said output of said first comparator and a second input coupled to a first output of a waveform generator means, said waveform generator producing a triangular waveform signal having a given magnitude and a predetermined frequency at its first output, said second comparator having an output and producing an output voltage signal having a duration substantially equal to the time that the magnitude of said triangular signal exceeds said output voltage signal produced by said first comparator;

first switching means for coupling one line of a DELTA configured three-phase voltage source to one input of the heating element;

second switching means for coupling a seocnd line of the DELTA configured three-phase voltage source to a second input of the heating element, and means responsive to said second comparator and coupled between said second comparator output and said first and second switching means for operating said first and second switching means when an output voltage signal is present at said second comparator output so that both inputs of the heating element are alternately connected and dsiconnected from the three-phase voltage source at said predetermined frequency when the temperature produced by the heater is less than the desired temperature.

12. A temperature controller and alarm device as defined in claim 11 further including:

third comparator means having one input coupled to said output of said first amplifier and a second input coupled to a fixed magnitude predetermined voltage reference source, said fixed magnitude corresponding to the magnitude of the output signal of said first amplifier when the heater is at a predetermined warm-up temperature, said third comparator having an output coupled to said one input of said second comparator and producing an output voltage signal having a magnitude signal substantially equal to the magnitude of the output voltage signal produced by said second comparator when said desired temperature is set equal to said warm-up temperature.

13. A temperature controller and alarm device as defined in claim 12 wherein said warm-up temperature is approximately 250° F.

14. A temperature controller and alarm device as defined in claim 11 further including:

oscillator circuit means for producing an oscillatory output signal when the impedance of the oscillation feedback loop is within a predetermined range to sustain oscillation, said feedback loop being arranged to include the thermocouple, said oscillator sustaining oscillation when the impedance of the thermocouple is such that the impedance of said feedback loop is within said predetermined range, first alarm circuit means coupled to said oscillator and sensitive to said oscillatory output signal, said first alarm circuit producing a first alarm signal in response to sensing an absence of said oscillatory signal, said first alarm signal being coupled to a first visual alerting indicator and activating said first indicator when said first alarm signal is produced, said first alarm signal further being coupled to alarm responsive means responsive to the presence of said first alarm signal and having an output coupled to said one input of said second comparator to prevent said second comparator from producing a voltage signal at its output so that said first and second switching means remain unoperated, said first alarm signal being representative of a high impedance fault condition associated with the thermocouple.

15. A temperature controller and alarm device as defined in claim 14 further including:

first current sensing circuit means for sensing the current supplied to said one and said second inputs of the heating element, said first current sensing circuit producing an output signal when the current supplied to said one input of the heating element is not equal to the current supplied to said second input of the heating element, and second alarm circuit means coupled to said first current sensing circuit and responsive to said first current sensing output signal, said second alarm circuit producing a second alarm signal in response to sensing said output signal, said second alarm signal being coupled to a second visual alerting indicator and activating said second indicator when said second alarm signal is produced, said second alarm signal further being coupled to said alarm responsive means for causing said first and second switching means to remain unoperated when said second alarm signal is produced, said second alarm signal being representative of a short circuit fault condition between the heating element and the cartridge.

16. A temperature controller and alarm device as defined in claim 15 further including:

second current sensing circuit means for sensing current supplied to the heating element, said second current sensing means producing an output voltage signal when current is applied to the heating element, third alarm circuit means coupled to said second current sensing circuit and to said output of said second comparator, said third alarm circuit responsive to said second current sensing output voltage signal and producing a third alarm signal in the absence of said second current sensing output signal when the output signal from said second comparator is present, said third alarm signal further being coupled to said second visual alerting indicator and activating said second indicator when said third alarm signal is produced, said third alarm signal further being coupled to said alarm responsive means for causing said first and second switching means to remain unoperated when said third alarm signal is produced, said third alarm signal being representative of an open circuit fault condition associated with the heating element.

* * * * *